(12) United States Patent
Yang et al.

(10) Patent No.: US 10,323,812 B2
(45) Date of Patent: Jun. 18, 2019

(54) INTELLIGENT AUTOMOTIVE HEADLAMP MODULE WITH COMBINED FUNCTIONS

(71) Applicant: SHANGHAI KOITO AUTOMOTIVE LAMP CO., LTD, Shanghai (CN)

(72) Inventors: Juejing Yang, Shanghai (CN); Liangliang Wang, Shanghai (CN); Lei Niu, Shanghai (CN)

(73) Assignee: SHANGHAI KOITO AUTOMOTIVE LAMP CO., LTD, Shanghai (CN)

( * ) Notice: Subject to any disclaimer, the term of this patent is extended or adjusted under 35 U.S.C. 154(b) by 0 days.

(21) Appl. No.: 15/977,994

(22) Filed: May 11, 2018

(65) Prior Publication Data

US 2018/0340664 A1    Nov. 29, 2018

(30) Foreign Application Priority Data

May 25, 2017   (CN) .......................... 2017 1 0379570
May 25, 2017   (CN) ..................... 2017 2 0593751 U

(51) Int. Cl.
| | |
|---|---|
| *F21S 41/00* | (2018.01) |
| *F21S 41/16* | (2018.01) |
| *B60Q 1/08* | (2006.01) |
| *F21S 41/675* | (2018.01) |
| *F21S 41/20* | (2018.01) |

(Continued)

(52) U.S. Cl.
CPC .............. *F21S 41/16* (2018.01); *B60Q 1/085* (2013.01); *F21S 41/13* (2018.01); *F21S 41/176* (2018.01); *F21S 41/20* (2018.01); *F21S 41/265* (2018.01); *F21S 41/285* (2018.01);

(Continued)

(58) Field of Classification Search
CPC .......... F21S 41/16; F21S 41/176; F21S 41/18; F21S 41/265; F21S 41/285; F21S 41/675; F21S 41/68; F21S 41/365; F21S 41/30
See application file for complete search history.

(56) References Cited

U.S. PATENT DOCUMENTS

| | | | |
|---|---|---|---|
| 2015/0137680 A1* | 5/2015 | Komatsu | B60Q 1/0023 315/82 |
| 2015/0375672 A1* | 12/2015 | Takahashi | G02B 6/0068 701/49 |

(Continued)

FOREIGN PATENT DOCUMENTS

CN        106594620 A   *   4/2017

*Primary Examiner* — Gerald J Sufleta, II
(74) *Attorney, Agent, or Firm* — CBM Patent Consulting, LLC

(57) ABSTRACT

An intelligent automotive headlamp module with combined functions comprises a three-color laser light source array (1), a beam combination lens assembly (2) used for converging three-color laser light, an electric-controlled deflecting reflector unit (3) arranged in the light emergence direction of the laser beam combination lens assembly (2), and a transmission-type fluorescent material (5), wherein the reflecting surfaces (A-1, B-1) of the reflector unit rotate around the axes in a reciprocating mode at a high speed, and thus a reciprocating scanning segment is formed; the transmission-type fluorescent material (5) converts blue single-wavelength light irradiating the front side of the transmission-type fluorescent material (5) into white complex-wavelength light, and the white complex-wavelength light is output from the back side of the transmission-type fluorescent material (5).

16 Claims, 10 Drawing Sheets

(51) Int. Cl.
*F21S 41/13* (2018.01)
*F21S 41/265* (2018.01)
*F21S 41/32* (2018.01)
*F21S 41/663* (2018.01)
*F21S 41/365* (2018.01)
*F21S 41/176* (2018.01)

(52) U.S. Cl.
CPC ........... *F21S 41/321* (2018.01); *F21S 41/365* (2018.01); *F21S 41/663* (2018.01); *F21S 41/675* (2018.01)

(56) References Cited

U.S. PATENT DOCUMENTS

| | | | |
|---|---|---|---|
| 2016/0153633 A1* | 6/2016 | Shibata | F21S 41/14 362/510 |
| 2017/0030544 A1* | 2/2017 | Tsuda | G02B 26/10 |
| 2017/0113599 A1* | 4/2017 | Park | F21S 41/36 |
| 2017/0240094 A1* | 8/2017 | Kunecke | F21V 25/02 |
| 2017/0307167 A1* | 10/2017 | Hadrath | F21S 48/1394 |
| 2017/0334341 A1* | 11/2017 | Kurashige | F21S 41/675 |
| 2017/0337821 A1* | 11/2017 | Masuda | B60Q 1/00 |
| 2018/0284584 A1* | 10/2018 | Itoh | G03B 21/208 |
| 2019/0024862 A1* | 1/2019 | Kurashige | F21S 41/00 |

* cited by examiner

INTELLIGENT AUTOMOTIVE HEADLAMP MODULE WITH COMBINED FUNCTIONS

This application claims priority to Chinese Patent Application Ser. No. CN201710379570.X and CN201720593751.8 filed on 25 May 2017.

BACKGROUND OF THE INVENTION

Technical Field

The invention relates to the field of automotive lamps, in particular to an intelligent automotive headlamp module with combined functions, the intelligent automotive headlamp module with combined functions is formed by combining a high-resolution headlamp used for automotive headlamp illumination with a semiconductor laser element (laser radar transmitter), and the intelligent AFS function, the intelligent ADB function and the intelligent ADAS function are achieved through one optical module.

Description of Related Art

Since vehicle night-driving safety problems are becoming increasingly prominent, more and more automobile manufacturers are developing novel intelligent automotive headlamp techniques. The novel intelligent automotive headlamp techniques are mainly used for achieving the adaptive frontlighting system (AFS). AFS can continuously adjust a headlamp dynamically, so that the illuminating direction of the headlamp is kept consistent with the current traveling direction of an automobile to ensure that a driver has the optimal visibility at any moment.

An ordinary headlamp has a fixed irradiation range. When the automobile steers on a curve at night, a blind zone is generally generated on the inner side of the curve due to the fact that the illuminating angle cannot be adjusted, and consequentially, safe night-driving by the driver is severely threatened. The adaptive frontlighting system (AFS) can automatically adjust the headlamp to deflect according to the traveling speed, the steering angle, and the like so as to illuminate the area that the automobile has not yet reached, and omnidirectional, safe illumination is provided to make sure that the driver has the optimal visibility at any moment.

On the other hand, the driver is likely to be dazzled due to misuse of high beams for oncoming night traffic, and consequentially traffic accidents are caused. However, an ADB can improve oncoming night traffic safety. An ADB adaptive distant light system is composed of a camera, a sensor, an electronic control unit, a headlamp, an image processing system and a hardware processor and can detect the positions of other vehicles or pedestrians on the road, a dark area can be formed automatically at the corresponding position in the distant light while passing, and thus drivers in the opposite direction are prevented from being dazzled, and the oncoming night traffic safety is improved.

In addition, to further improve the vehicle driving safety, the requirements for an advanced driver assistance system (ADAS) and an even more advanced autonomous driving system are put forward.

Image recognition is an important part of the ADAS, however, visible light imaging is difficult under the influence of poor illumination at night, and driving assisting functions such as the FCW function and the LDW function cannot be achieved through ADAS provided only with a camera and a processor. Furthermore, the cost is increased and the effect is limited if the problem is solved purely by improving the CMOS performance of the camera and the camera pixels. The ADB system can enhance illumination by regulating the color temperature, distant light and passing light, and the night image recognition capacity of the ADAS system can be improved through ADB.

For example, when a detection system and a headlamp with the ADB function of the vehicle cooperatively detect that another user on the road is located in a certain illumination zone of the headlamp, the system can intelligently adjust the illuminating brightness of the zone and even directly cut off illumination to the zone, so that an independent local dark area is formed in the whole illumination space, and accordingly the user in the illumination zone is prevented from being dangerously dazzled. Meanwhile, high-brightness illumination continues to be kept in the space without other road users. Based on the above technical support, high-quality illumination in front of the vehicle provided by an adaptive LED headlamp can be ensured, other users on the road (such as vehicles traveling in the same direction and in the opposite direction) are prevented from being dangerously dazzled, and night-driving safety of the vehicles in both directions of the road is ensured.

Both the advanced driver assistance system (ADAS) and the more advanced autonomous driving system require a high-precision forward-looking detection capacity of the vehicle, and forward-looking laser radar is an extremely appropriate sensor scheme.

In the presence of the ADAS system scheme, the following technical scheme is put forward to improve driving safety: certain information prompts closely related to driving, such as vehicle speed prompts, pedestrian position prompts and navigation prompts, are projected on the road surface, and the driver can obtain the information prompt beyond the detection capacity of human eyes more visually based on the augmented reality technique.

Up to now, the AFS technique, the ADB technique and the ADAS technique have been mutually independent, and if the three techniques need to be applied to a specific vehicle, three independent devices need to be mounted on the vehicle to achieve the inherent functions of the three techniques.

For example, the Novel Intelligent Automobile Lamp Module with the Chinese patent application No. 201610958902.5 and the PCT application No. PCT/CN2017/074197 and High-Resolution Automotive Headlamp Optical Module and High-Resolution Distance-Light Illumination Control Method Thereof with the Chinese patent application No. 201610962328.0 and the PCT application No. PCT/CN2017/074200 provide technical schemes for realizing the AFS function and the ADB function respectively, but the ADAS function is not involved.

To change the current situation, an optical module is needed in the field to integrate the three functions. Namely, an intelligent automotive headlamp module with combined functions is required, and the intelligent automotive headlamp module with combined functions is formed by combining a high-resolution headlamp for automotive headlamp illumination with a laser radar transmitter.

BRIEF SUMMARY OF THE INVENTION

For achieving the above purpose, the invention aims to provide an intelligent automotive headlamp module with combined functions, the intelligent automotive headlamp module with combined functions is formed by combining a high-resolution headlamp used for automotive headlamp illumination with a laser radar transmitter (namely a laser element), the novel high-resolution headlamp used for automotive headlamp illumination and the laser radar transmitter are combined, and the three functions mentioned above are achieved through one optical module.

To achieve the above purpose, the following technical scheme is adopted by the invention:

An intelligent automotive headlamp module with combined functions comprises a three-wavelength laser light source array (1), a beam combination lens assembly (2) used for converging three-wavelength laser light, a projection lens assembly (6) used for projecting the three-wavelength laser light and having different imaging capacities, high-reflectivity laser filter and reflection pieces arranged in front of the projection lens assembly (namely in the laser light incidence direction) and used for reflecting and filtering the three-wavelength laser light, a two-dimensional electric-controlled deflecting reflector unit (3) arranged between the laser beam combination lens assembly (2) and the projection lens assembly (6) with different imaging capacities, and is characterized in that the three-wavelength laser light source array comprises blue-wavelength semiconductor laser light source arrays (1-1), an infrared-wavelength semiconductor laser light source array (1-2) and a green-wavelength semiconductor laser light source array (1-3);

the projection lens assembly (6) with different imaging capacities comprises a first projection lens assembly (6-1) used for projecting blue-wavelength laser light, a second projection lens assembly (6-2) used for projecting infrared-wavelength laser light, and a third projection lens assembly (6-3) used for projecting green-wavelength laser light;

a transmission-type fluorescent material (5) is arranged between the first projection lens assembly (6-1) and the corresponding high-reflectivity laser filter and reflection piece (4-1) and used for converting blue-wavelength light irradiating the front side of the transmission-type fluorescent material (5) into white complex-wavelength light, a white light spot is output from the back side of the transmission-type fluorescent material (5), and the white light spot on the back side of the transmission-type fluorescent material is in one-to-one correspondence with the laser-converged light spot on the front side of the transmission-type fluorescent material in shape;

the blue-wavelength laser light is converged on the fluorescent material to form a pixel after penetrating through the high-reflectivity laser filter and reflection piece, and thus high-resolution visible light is formed for illumination.

According to the invention, each semiconductor laser light source array is composed of a plurality of high-power semiconductor laser elements. The number of blue-wavelength semiconductor laser elements is larger than the number of infrared-wavelength semiconductor laser elements and the number of green-wavelength semiconductor laser elements.

According to the invention, the blue-wavelength semiconductor laser light source arrays are composed of 6-8 high-power semiconductor laser elements. The infrared-wavelength semiconductor laser light source array and the green-wavelength semiconductor laser light source array are each composed of 3-4 high-power semiconductor laser elements.

According to the invention, the blue wavelength is 450 nm or around, the infrared wavelength is 906 nm or around, and the green wavelength is 532 nm or around.

The laser beam combination lens assembly is used for converging a plurality of light beams which have different wavelengths and are generated by the angled semiconductor laser elements into a small light spot with the designed size at a certain distance. According to the operating process, light emitted by the blue semiconductor elements is collimated into parallel light through collimating lenses mounted in front of the blue semiconductor elements, light originally from opposite directions is made to travel in the same direction through a reflecting prism and then enters the beam combination lens assembly in the optical axis direction of the beam combination lens assembly, and the beam combination lens assembly converges the parallel incident light into a small light spot on a certain focus.

The intelligent automotive headlamp module with combined functions of the invention is characterized in that the first projection lens assembly (6-1) right faces the laser beam combination lens assembly (2) and is arranged in parallel with the axial direction of the laser beam combination lens assembly (2), and the second projection lens assembly (6-2) and the third projection lens assembly (6-3) are arranged beside the laser beam combination lens assembly (2) respectively.

According to the invention, the infrared-wavelength semiconductor laser light source array and the green-wavelength semiconductor laser light source array right face the laser beam combination lens assembly and are arranged in parallel with the axial direction of the laser beam combination lens assembly, the blue-wavelength semiconductor laser light source arrays are perpendicular to the axial direction of the laser beam combination lens assembly and arranged on the two sides of the laser beam combination lens assembly, and the laser beam combination lens assembly converges parallel incident light of the infrared-wavelength semiconductor laser light source array and the green-wavelength semiconductor laser light source into a small light spot on a certain focus, as is shown in FIG. 3.

The intelligent automotive headlamp module with combined functions of the invention is characterized in that the infrared-wavelength semiconductor laser light source array (1-2) and the green-wavelength semiconductor laser light source array (1-3) right face the laser beam combination lens assembly (2) and are arranged in parallel with the axial direction of the laser beam combination lens assembly (2), the blue-wavelength semiconductor laser light source arrays (1-1) are perpendicular to the axial direction of the laser beam combination lens assembly (2) and arranged on the two sides of the laser beam combination lens assembly (2), and the laser beam combination lens assembly (2) converges parallel incident semiconductor laser light into a small light spot on a certain focus.

The intelligent automotive headlamp module with combined functions of the invention is characterized in that the two-dimensional electric-controlled deflecting reflector unit (3) is controlled by an external electronic signal to rapidly rotate in a reciprocating mode around the rotation axis of the two-dimensional electric-controlled deflecting reflector unit, and in the high-speed reciprocating rotation process, the relative zero state of the rotation axis, namely the angle at the initial position, can be measured at any specific moment and is fed back to an external circuit in real time.

The two-dimensional electric-controlled deflecting reflector unit can be electrostatically driven and can also be controlled by a magnetic field to obtain mechanical force to achieve rapid reciprocating rotation around the axis under the control of the external electronic signal.

The intelligent automotive headlamp module with combined functions of the invention is characterized in that a reflector of the electric-controlled deflecting reflector unit is mounted on the rotation axis of the two-dimensional electric-controlled deflecting reflector unit, the normal lines of the reflecting surfaces of the reflector are perpendicular to the rotation axis, and the reflector can rotate around the rotation axis under the control of the two-dimensional electric-controlled deflecting reflector unit; at the same time, the normal lines of the reflecting surfaces of the reflector also swing around the rotation axis in a reciprocating mode at a high speed, and thus a reciprocating scanning segment is formed within the rotation angle range defined by the two-dimensional electric-controlled deflecting reflector unit.

The intelligent automotive headlamp module with combined functions of the invention is characterized in that a first electric-controlled deflecting reflector unit (A) and a second electric-controlled deflecting reflector unit (B) which are spatially perpendicular are mounted on the two-dimensional electric-controlled deflecting reflector unit (3), the first electric-controlled deflecting reflector unit (A) is arranged transversely and used for longitudinal scanning, and the second electric-controlled deflecting reflector unit (B) is arranged longitudinally and used for transverse scanning;

longitudinal scanning of the first electric-controlled deflecting reflector unit (A) forms a straight line on the second electric-controlled deflecting reflector unit (B), meanwhile, through transverse scanning of the second electric-controlled deflecting reflector unit (B), the laser-converged light spot is made to have the characteristic of progressive scanning in space, and when the first electric-controlled deflecting reflector unit (A) and the second electric-controlled deflecting reflector unit (B), which are spatially perpendicular, swing in a reciprocating mode at a high speed, the converged light spot also moves back and forth for scanning.

The intelligent automotive headlamp module with combined functions of the invention is characterized in that when a two-dimensional laser scanning device formed by the first electric-controlled deflecting reflector unit (A) and the second electric-controlled deflecting reflector unit (B) rotates in a reciprocating mode at a high speed, the laser light spot also conducts high-speed progressive linear scanning on the transmission-type fluorescent material, and the white light spot formed on the back side of the transmission-type fluorescent material through conversion moves correspondingly; under the visual persistence effect, a white rectangular light spot corresponding to the scanning angle is seen with human eyes on a screen a certain distance away from the back side of the transmission-type fluorescent material, a basic distant light pattern is formed, and the basic automotive distant light illumination function is provided.

According to the invention, the laser-converged light spot is a pixel.

According to the invention, the transmission-type fluorescent material is fluorescent ceramic.

When the two-dimensional laser scanning device formed by the first electric-controlled deflecting reflector unit A and the second electric-controlled deflecting reflector unit B rotate in a reciprocating mode at a high speed, the laser light spot also conducts high-speed progressive linear scanning on the transmission-type fluorescent material, and the white light spot formed on the back side of the transmission-type fluorescent material through conversion moves correspondingly; under the visual persistence effect, a white rectangular light spot corresponding to the scanning angle is seen with human eyes on a screen a certain distance away from the back side of the transmission-type fluorescent material, a basic distant light pattern is formed, and the basic automotive distant light illumination function is provided.

The intelligent automotive headlamp module with combined functions of the invention is characterized in that the height of the white rectangular light spot, namely the longitudinal scanning range, depends on the deflection angle range of the first electric-controlled deflecting reflector unit A, and the width of the white rectangular light spot depends on the rotation angle range defined by the second electric-controlled deflecting reflector unit B.

The intelligent automotive headlamp module with combined functions of the invention is characterized in that the maximum transverse angle of the white rectangular light spot finally transmitted out through the projection lens assemblies (6) is +/−20°, the angle range can be divided by the second electric-controlled deflecting reflector unit (B), and thus the deflection angle of the reflector at a particular moment can be sensed in real time.

The intelligent automotive headlamp module with combined functions of the invention is characterized in that the high-reflectivity laser filter and reflection piece (4-1) is arranged in the laser incidence direction of the first projection lens assembly (6-1), blue-wavelength laser light penetrates through the high-reflectivity laser filter and reflection piece (4-1) while infrared-wavelength laser light and green-wavelength laser light are reflected, and thus the blue-wavelength laser light is separated from the infrared-wavelength laser light and the green-wavelength laser light;

the separated infrared-wavelength laser light spreads in the advancing direction of the vehicle after passing through the reflector and enters the projection lens assembly to be projected into the illumination zone in front of the vehicle.

The high-reflectivity laser filter and reflection piece (4-2) is arranged in the laser incidence direction of the second projection lens assembly (6-2), and the green-wavelength laser light penetrates through the high-reflectivity laser filter and reflection piece (4-2) while the infrared-wavelength laser light is highly reflected.

The intelligent automotive headlamp module with combined functions of the invention is characterized in that the high-reflectivity laser filter and reflection piece is arranged in the laser incidence direction of the second projection lens assembly, and the green-wavelength laser light penetrates through the high-reflectivity laser filter and reflection piece while the infrared-wavelength laser light is highly reflected.

The intelligent automotive headlamp module with combined functions of the invention is characterized in that the high-reflectivity laser filter and reflection piece (4-3) is arranged in the laser incidence direction of the third projection lens assembly (6-3), the green-wavelength laser light continues to spread after penetrating through the high-reflectivity laser filter and reflection piece (4-3) till reaching the reflector which can highly reflect the green-wavelength laser light, and then the green-wavelength laser light spreads in the advancing direction of the vehicle to be projected to the illumination zone in front of the vehicle.

The intelligent automotive headlamp module with combined functions of the invention is characterized in that the high-resolution pixelated green illumination light projected in the illumination zone in front of the vehicle is used for forming a series of special patterns indicating the current vehicle speed, navigation instructions, virtual lane lines, predicted vehicle traveling tracks, and the like.

Since human eyes are sensitive to the green-wavelength band, the green patterns are extremely outstanding against the white headlamp.

According to the invention, based on the development of the ADAS, certain green complex patterns are provided based on existing white illumination to provide necessary information to ensure intelligent driving, and the driver can obtain driving assistance information easily without lowering their head in the driving process. The information includes the vehicle speed, the vehicle state, navigation information, the weather (road surface) conditions, and other prompt information projected into the fixed area and information displayed at a large view angle, such as a pedestrian position tracing prompt, dynamic lane line prompt, and vehicle traveling area prediction information.

The intelligent automotive headlamp module with combined functions of the invention is characterized in that the transverse width of the light spot converged on the transmission-type fluorescent material is 0.1-0.3 mm, and the actual transverse angular resolution of the light spot finally projected in the illumination zone in front of the vehicle is 0.01-0.05°.

Under the spatial resolution, all special illumination lights (passing lights, distant lights, front fog lamplights, adaptive frontlighting and the like) required by existing laws and regulations can be obtained easily. When the vehicle detects another user on the road through a detection tool such as a camera, and judges that distant light needs to be shielded for the participator according to the position of the other participator relative to the vehicle, the required distant light can be shielded internally and locally as long as the laser elements are turned off when the laser pixel under continuous progressive scanning passes through the position corresponding to the other participator on the road, as is shown in FIG. 7.

The intelligent automotive headlamp module with combined functions of the invention is characterized in that under the irradiating distance of 400 m, the smallest dark area of the system of the invention is 0.35 m according to the formula: tan 0.05°×400=0.35.

According to the invention, the electric-controlled deflecting reflector unit is a galvanometer or an MEMS.

The reflector of the electric-controlled deflecting reflector unit is arranged in a converged light path formed by the laser beam combination unit, so that the converged light path is reflected through the reflector to form a new converging point.

As mentioned above, since an external circuit and software can know the angle in the relative zero state when the reflector deflects in a reciprocating mode at a high speed, the specific position of the tiny, point-like light spot on the back side of the fluorescent material at a specific moment in the white rectangular light spot formed under the visual persistence effect can be obtained through simple calculation.

The positions of the electric-controlled deflecting reflector unit A and the electric-controlled deflecting reflector unit B at a specific moment in the high-speed two-dimensional progressive scanning process can also be obtained and recorded by the external control circuit and the driving software through simple calculation according to the specific angle of the rotation axis at the moment.

When the two-dimensional scanning device formed by the first electric-controlled deflecting reflector unit A and the second electric-controlled deflecting reflector unit B rotates in a reciprocating mode at a high speed, the converged light spot also moves back and forth for scanning, namely, longitudinal scanning of the electric-controlled deflecting reflector unit A forms a straight line on the second electric-controlled deflecting reflector unit (B); meanwhile, through transverse scanning of the electric-controlled deflecting reflector unit B, the laser-converged light spot is made to have the characteristic of progressive scanning in space, and the white light spot formed on the back side of the transmission-type fluorescent material through conversion moves correspondingly; under the visual persistence effect, a white rectangular light spot corresponding to the scanning angle is seen with human eyes on a screen a certain distance away from the back side of the transmission-type fluorescent material, a basic distant light pattern is formed, and the basic automotive distant light illumination function is provided.

Beneficial Effect of the Invention

According to the invention, a head-sized dark area can be formed when drivers in the opposite direction are located at different positions, so that the drivers in the opposite direction are prevented from being dazzled; the two-dimensional scanning device is used for two-dimensional optical progressive scanning so that the AFS function, the ADB function, and the ADAS function can be optimally integrated in the intelligent automotive headlamp module, and meanwhile, the cost of a whole system is substantially reduced.

In the FIGS.: 1, three-wavelength laser light source array; 1-1, blue-wavelength laser light source array; 1-2, infrared-wavelength laser light source array; 1-3, green-wavelength laser light source array; 2, laser beam combination lens assembly; 3, two-dimensional electric-controlled deflecting reflector unit; A, first electric-controlled deflecting reflector unit; B, second electric-controlled deflecting reflector unit; A-1, reflecting surface of the first electric-controlled deflecting reflector unit; B-1, reflecting surface of the second electric-controlled deflecting reflector unit; 4, high-reflectivity laser filter and reflection piece assembly; 4-1, high-reflectivity laser filter and reflection piece (high-reflectivity light filter) of the first projection lens assembly of 6-1; 4-2, high-reflectivity laser filter and reflection piece (high-reflectivity light filter) of the second projection lens assembly of 6-2; 4-3, high-reflectivity laser filter and reflection piece (high-reflectivity light filter) of the third projection lens assembly of 6-3; 5, transmission-type fluorescent material; 6, projection lens assembly with different imaging capacities; 6-1, first projection lens assembly; 6-2, second projection lens assembly; 6-3, third projection lens assembly; 7, reflecting prism; 8, collimating lens; 9, point light spot; 10, white rectangular light spot; 11, converged point light spot; 12, vehicle traveling in the opposite direction on the road; 13, the position of the scanning light spot at a specific moment; 14, persistence image of the scanning light spot generated under visual effect in the scanning process; 15, projection view screen; L, blue laser light path; R, infrared laser light path; L+R, blue-infrared dual-wavelength laser light path formed after beam combination; G, green laser light path.

As is shown in FIG. 4, FIG. 5, FIG. 6 and FIG. 9, the first electric-controlled deflecting reflector unit A rotates around the transverse axis in a reciprocating mode, and the second electric-controlled deflecting reflector unit B rotates around the longitudinal axis in a reciprocating mode.

Figure 7:
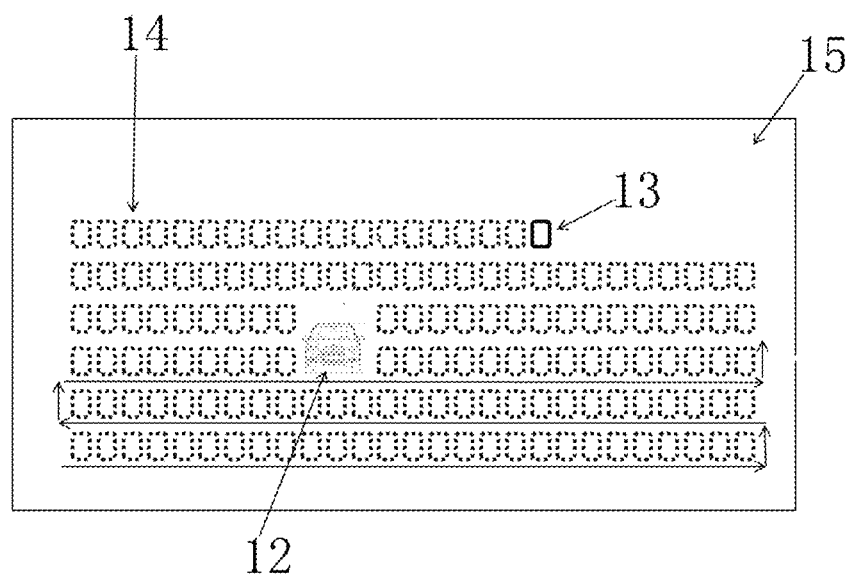
FIG. 7 is a schematic diagram of the working process for shielding the pixelated progressive scanning light of the intelligent automotive headlamp module for a target on the road of the invention.
Figure 8:
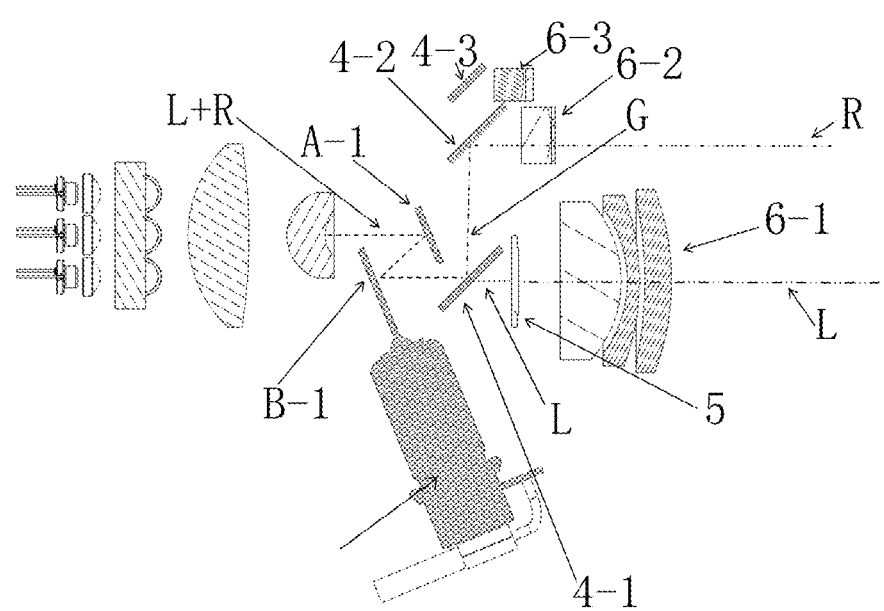
FIG. 8 is a schematic diagram of a scheme of the section of a laser high-resolution illumination and infrared-wavelength laser radar transmitting terminal of the intelligent automotive headlamp module of the invention.

As is show in FIG. 7, under the control of an electronic system, the required dark area corresponding to the required shielding width in the distant light can be formed by turning off laser light sources when the reflector of the electric-controlled deflecting reflector unit progressively scans to the angle range requiring distant light shielding.

Figure 9:
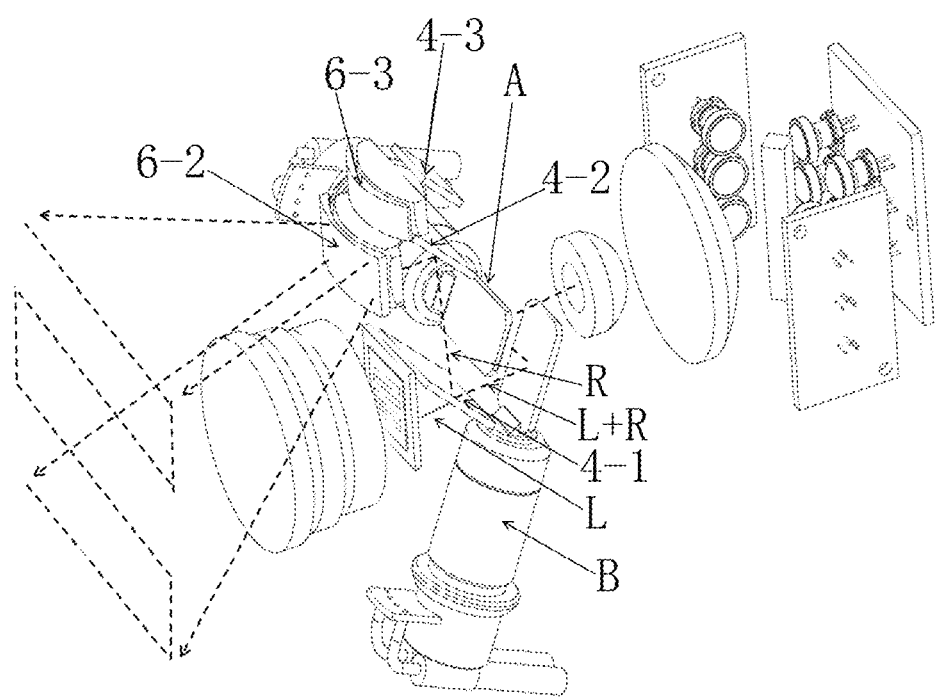
FIG. 9 is a schematic diagram of the progressive scanning characteristic of the invention presented after infrared-wavelength laser light of the intelligent automotive headlamp module is projected.
Figure 10:
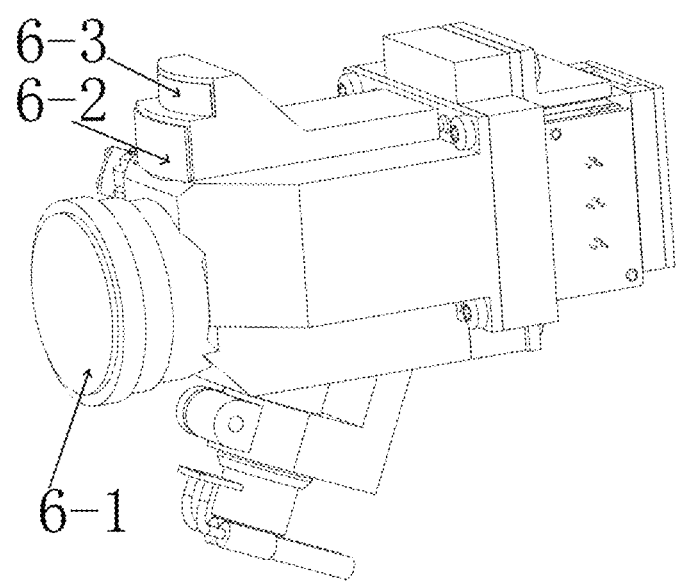
FIG. 10 is a space diagram of the intelligent automotive headlamp.

As is shown in FIG. 9, progressive scanning is presented in the irradiation space after the infrared-wavelength laser light is projected.

As is shown in the FIGS., the green-wavelength semiconductor laser elements and the infrared-wavelength semiconductor laser elements are mounted in parallel, and light emitted by the green-wavelength semiconductor laser elements and light emitted by the infrared-wavelength semiconductor laser elements enter the coupling lens assembly and enter the two-dimensional optical scanning device formed by the electric-controlled deflecting reflector unit A and the electric-controlled deflecting reflector B after being converged; like the high-resolution white light illumination condition mentioned above, the green-wavelength laser light also has the characteristic of two-dimensional progressive scanning through the above process, so that high-resolution pixelated green illumination is achieved, and complex green patterns can be formed on the road surface or other irradiated objects in front easily.

DETAILED DESCRIPTION OF THE INVENTION

Embodiment

An intelligent automotive headlamp module with combined functions comprises a three-wavelength laser light source array, a reflecting prism used for reflecting three-wavelength laser light, a beam combination lens assembly used for converging the three-wavelength laser light, high-reflectivity laser filter and reflection pieces (namely high-reflectivity light filters) used for reflecting and filtering the three-wavelength laser light, a transmission-type fluorescent material, a projection lens assembly with different imaging capacities, and a two-dimensional electric-controlled deflecting reflector unit arranged between the laser beam combination lens assembly and the projection lens assembly with different imaging capacities.

The three-wavelength laser light source array comprises blue-wavelength semiconductor laser light source arrays with the wavelength of 450 nm or around, an infrared-wavelength semiconductor laser light source array with the wavelength of 906 nm or around, and a green-wavelength semiconductor laser light source array with the wavelength of 532 nm or around. The blue-wavelength semiconductor laser light source arrays are composed of six high-power semiconductor laser elements. The number of infrared-wavelength semiconductor laser elements is three, and the number of green-wavelength semiconductor laser elements is three.

As is shown in the FIGS., the projection lens assembly with different imaging capacities comprise a first projection lens assembly 6-1 used for projecting blue-wavelength laser light, a second projection lens assembly 6-2 used for projecting infrared-wavelength laser light, a third projection lens assembly 6-3 used for projecting green-wavelength laser light, and the high-reflectivity laser filter and reflection pieces corresponding to the projection lens assemblies respectively.

The first projection lens assembly 6-1 right faces the laser beam combination lens assembly and is arranged in parallel with the axial direction of the laser beam combination lens assembly (serving as an illumination projecting area), and the second projection lens assembly 6-2 and the third projection lens assembly 6-3 are arranged beside the laser beam combination lens assembly respectively.

Light emitted by the blue semiconductor elements is collimated into parallel light through collimating lenses mounted in front of the blue semiconductor elements, light originally from opposite directions is made to travel in the same direction through the reflecting prism and then enters the beam combination lens assembly in the optical axis direction of the beam combination lens assembly, and the beam combination lens assembly converges the parallel incident light into a small light spot on a certain focus.

The electric-controlled deflecting reflector unit is a galvanometer or a MEMS and is composed of a reflector and a two-dimensional electric-controlled deflecting reflector unit, the two-dimensional electric-controlled deflecting reflector unit is controlled by an external electronic signal to rapidly rotate in a reciprocating mode around the rotation axis of the two-dimensional electric-controlled deflecting reflector unit, and in the high-speed reciprocating rotation process, the angle of the rotation axis in the relative zero state can be measured at any moment and is fed back to an external circuit in real time.

The two-dimensional electric-controlled deflecting reflector unit can be electrostatically driven and can also be controlled by a magnetic field.

a first electric-controlled deflecting reflector unit (A) and a second electric-controlled deflecting reflector unit (B) which are spatially perpendicular are mounted on the two-dimensional electric-controlled deflecting reflector unit, the first electric-controlled deflecting reflector unit A is arranged transversely and used for longitudinal scanning, and the second electric-controlled deflecting reflector unit B is arranged longitudinally and used for transverse scanning. When the first electric-controlled deflecting reflector unit (A) and the second electric-controlled deflecting reflector unit (B), which are spatially perpendicular, are driven by the two-dimensional electric-controlled deflecting reflector unit to swing in a reciprocating mode at a high speed, the converged light spot also moves back and forth for scanning, as is shown in FIGS. 4-5.

According to the invention, the transmission-type fluorescent material is fluorescent ceramic. The transmission-type fluorescent material converts the blue-wavelength light irradiating the front side of the transmission-type fluorescent material into white complex-wavelength light, the white complex-wavelength light is output from the back side of the fluorescent material, and the a white light spot on the back side of the fluorescent ceramic is in one-to-one correspondence with a laser-converged light spot on the front side of the fluorescent ceramic in shape.

The transmission-type fluorescent material converts the blue-wavelength light irradiating the front side of the transmission-type fluorescent material into white complex-wavelength light, the white complex-wavelength light is output from the back side of the fluorescent material, and a white light spot on the back side of the fluorescent ceramic is in one-to-one correspondence with a laser-converged light spot on the front side of the fluorescent ceramic in shape.

Figure 1:
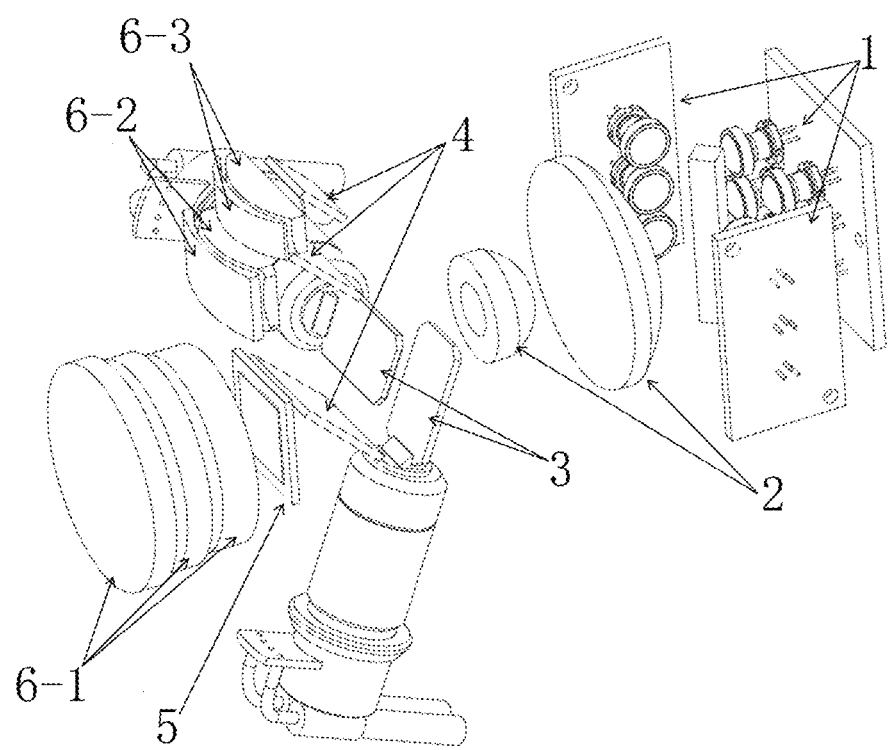
FIG. 1 is a system diagram of an intelligent automotive headlamp module of the invention.
Figure 2:
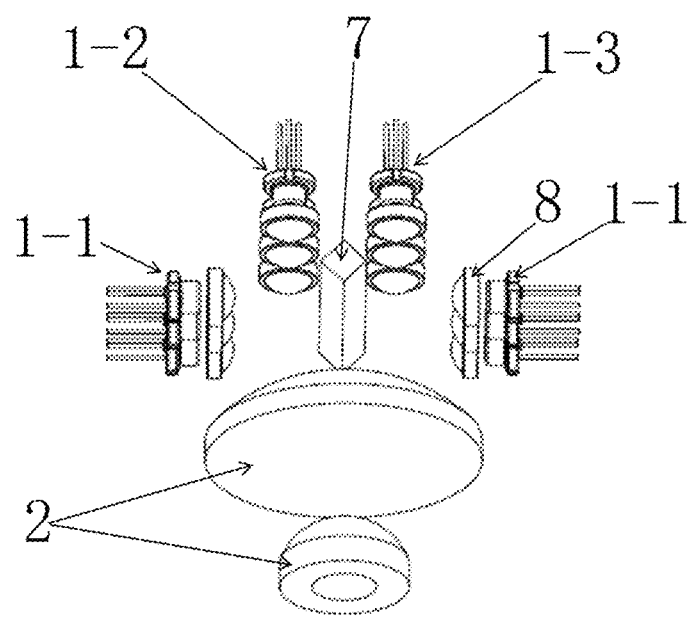
FIG. 2 is a schematic diagram of laser light source arrays and a laser beam combination lens assembly of the intelligent automotive headlamp module of the invention.
Figure 3:
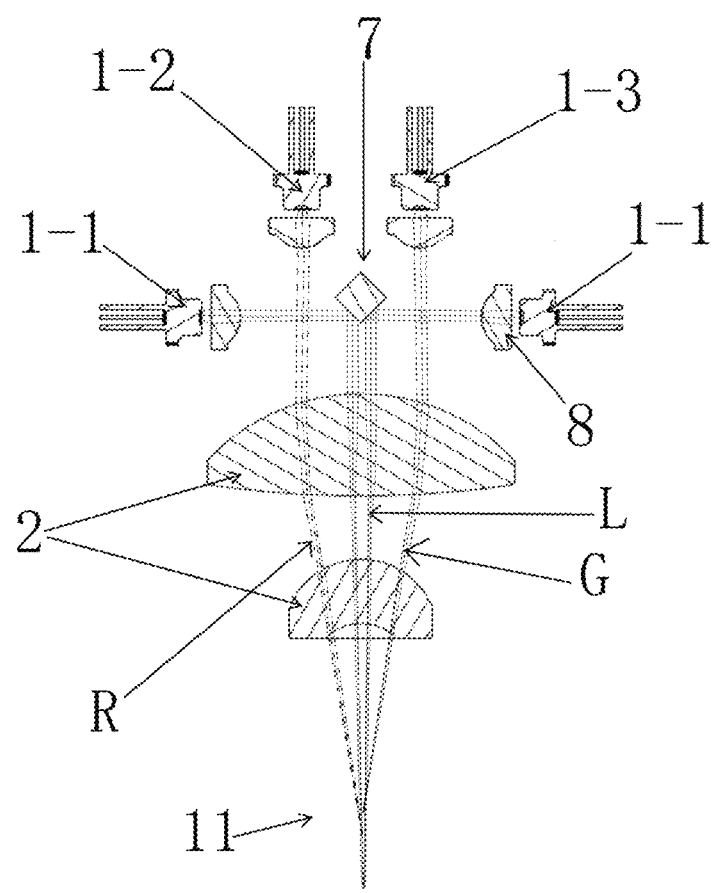
FIG. 3 is a light path diagram of the laser light source arrays and the laser beam combination lens assembly of the intelligent automotive headlamp module of the invention.
Figure 4:
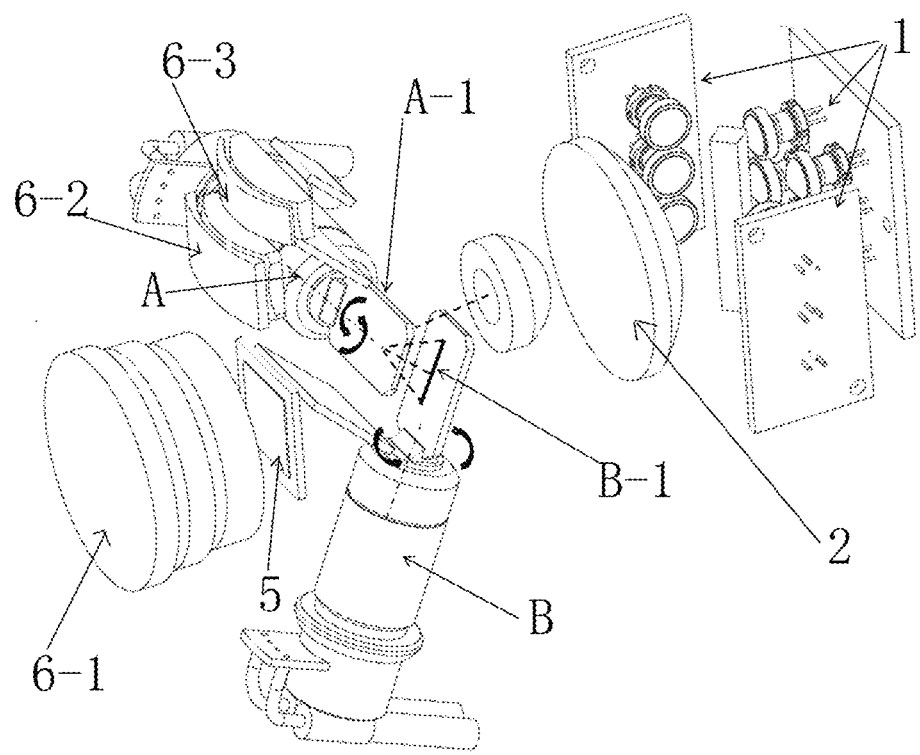
FIG. 4 is a schematic diagram of a two-dimensional scanning device of the intelligent automotive headlamp module of the invention.
Figure 5:
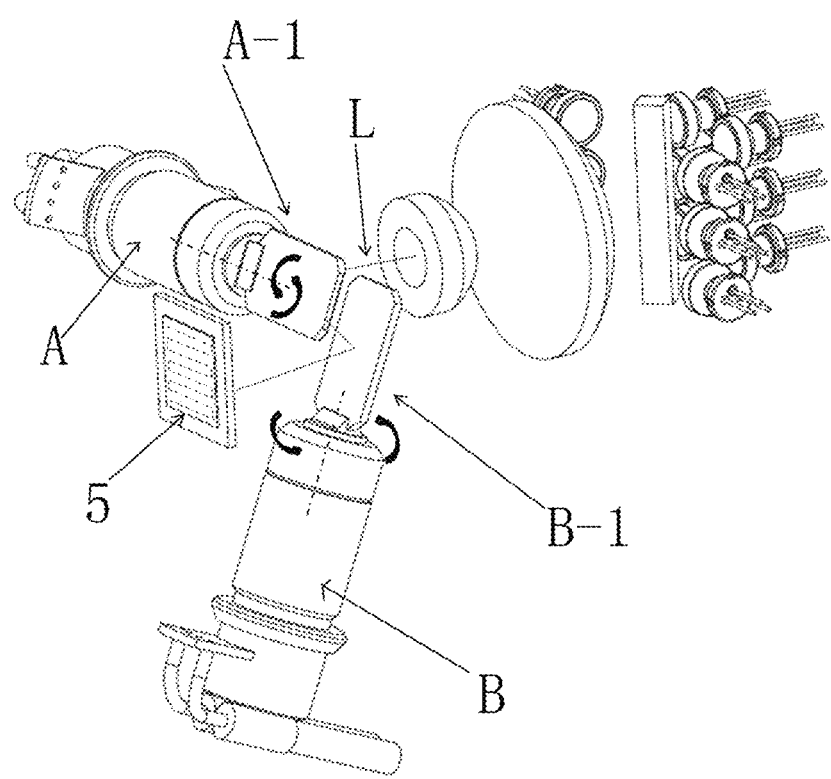
FIG. 5 is a schematic diagram of progressive scanning of laser light of the intelligent automotive headlamp module under the two-dimensional scanning device of the invention.
Figure 6:
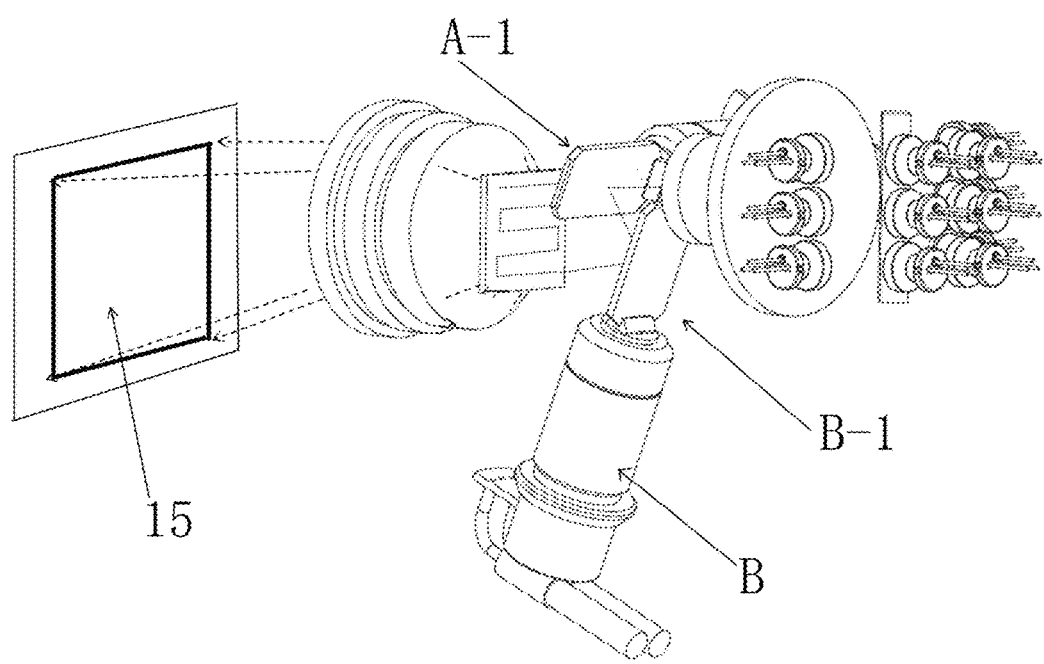
FIG. 6 is a schematic diagram of the process for forming vehicle illumination light through high-speed progressive scanning of the intelligent automotive headlamp module of the invention.

When the two electric-controlled deflecting reflector units A and B, which are spatially perpendicular, are driven by the two-dimensional electric-controlled deflecting reflector unit to swing in a reciprocating mode at a high speed, the converged light spot also moves back and forth for scanning, namely, longitudinal scanning of the first electric-controlled deflecting reflector unit A forms a straight line on the second electric-controlled deflecting reflector unit B, and meanwhile, through transverse scanning of the second electric-controlled deflecting reflector unit B, the laser-converged light spot is made to have the characteristic of progressive scanning in space, as is shown in FIGS. 4-5.

The white light spot formed on the back side of the transmission-type fluorescent material through conversion moves correspondingly, under the visual persistence effect, a white rectangular light spot corresponding to the scanning angle is seen with human eyes on a screen a certain distance away from the back side of the transmission-type fluorescent material, a basic distant light pattern is formed, and the basic automotive distant light illumination function is provided.

The maximum transverse angle of the light spot finally transmitted out through the projection lens assemblies is +/−20°, the angle range can be divided by the second electric-controlled deflecting reflector unit B, and thus the deflection angle of the reflector at a particular moment can be sensed in real time. Namely, the transverse angular resolution in the large white rectangular light spot formed under the visual persistence effect after projection reaches 40°/=0.001°, and the dark area pixel with the angular resolution of 0.001°*0.001° can be provided by the novel intelligent headlamp module.

Under the spatial resolution, all special illumination light (passing light, distant light, front fog lamplight, adaptive frontlighting and the like) required by existing laws and regulations can be obtained easily. When the vehicle detects another user on the road through a detection tool, such as a camera, and judges that distant light needs to be shielded for the participator according to the position of the other participator relative to the vehicle, the required distant light can be shielded internally and locally as long as the laser elements are turned off when the laser pixel under continuous progressive scanning passes through the position corresponding to the other participator on the road, as is shown in FIG. 7.

The green-wavelength semiconductor laser elements and the infrared-wavelength semiconductor laser elements are mounted in parallel, and light emitted by the green-wavelength semiconductor laser elements and light emitted by the infrared-wavelength semiconductor laser elements enter the coupling lens assembly and enter the two-dimensional optical scanning device formed by the electric-controlled deflecting reflector unit A and the electric-controlled deflecting reflector B after being converged. Like the high-resolution white light illumination condition mentioned above, green-wavelength laser light also has the characteristic of two-dimensional progressive scanning through the above process, high-resolution pixelated green illumination is achieved, and complex green patterns can be formed on the road surface or other irradiated objects in front easily.

After being integrated through the advanced driver assistance system (ADAS), the high-resolution pixelated green illuminating light is used for forming a series of special patterns indicating the current vehicle speed, navigation instructions, virtual lane lines, predicted vehicle traveling tracks, and the like, and the function of the augmented reality technique is implemented. Since human eyes are sensitive to the green-wavelength band, the green patterns are extremely outstanding against the white headlight.

Under the irradiating distance of 400 m, the smallest dark area of the system of the invention is 0.35 m according to the formula: $\tan 0.05° \times 400 = 0.35$.

According to the invention, a head-sized dark area can be formed when drivers in the opposite direction are located at different positions, so that the drivers in the opposite direction are prevented from being dazzled. The two-dimensional scanning device is used for two-dimensional optical progressive scanning so that the AFS function, the ADB function, and the ADAS function can be optimally integrated in the intelligent automotive headlamp module, and the cost of a whole system is substantially reduced.

What is claimed is:

1. An intelligent automotive headlamp module with combined functions, comprising a three-wavelength laser light source array (1), a beam combination lens assembly (2) used for converging three-wavelength laser light, a projection lens assembly (6) used for projecting the three-wavelength laser light and having different imaging capacities, at least three high-reflectivity laser filters and reflection pieces arranged in front of the projection lens assembly, namely in the laser light incidence direction, and used for reflecting and filtering the three-wavelength laser light, and a two-dimensional electric-controlled deflecting reflector unit (3) arranged between the laser beam combination lens assembly (2) and the projection lens assembly (6) with different imaging capacities; characterized in that the three-wavelength laser light source array comprises blue-wavelength semiconductor laser light source arrays (1-1), an infrared-wavelength semiconductor laser light source array (1-2) and a green-wavelength semiconductor laser light source array (1-3);

the projection lens assembly (6) with different imaging capacities comprises a first projection lens assembly (6-1) used for projecting blue-wavelength laser light, a second projection lens assembly (6-2) used for projecting infrared-wavelength laser light, and a third projection lens assembly (6-3) used for projecting green-wavelength laser light;

a transmission-type fluorescent material (5) is arranged between the first projection lens assembly (6-1) and a first high-reflectivity laser filter and reflection piece (4-1) and used for converting blue-wavelength light irradiating the front side of the transmission-type fluorescent material (5) into white complex-wavelength light, and a white light spot is output from the back side of the transmission-type fluorescent material (5), so that basic high-resolution distant light illumination is achieved;

the beam combination lens assembly (2) converges incident semiconductor laser light into a light spot on a certain focus, progressive scanning is achieved by the laser-converged light spot, and the white light spot on the back side of the transmission-type fluorescent material is in one-to-one correspondence with the laser-converged light spot on the front side of the transmission-type fluorescent material.

2. The intelligent automotive headlamp module with combined functions according to claim 1, characterized in that the first projection lens assembly (6-1) right faces the laser beam combination lens assembly (2) and is arranged in parallel with an axial direction of the laser beam combination lens assembly (2), and the second projection lens assembly (6-2) and the third projection lens assembly (6-3) are arranged beside the laser beam combination lens assembly (2) respectively.

3. The intelligent automotive headlamp module with combined functions according to claim 1, characterized in that the infrared-wavelength semiconductor laser light source array (1-2) and the green-wavelength semiconductor laser light source array (1-3) right face the laser beam combination lens assembly (2) and are arranged in parallel with the axial direction of the laser beam combination lens assembly (2), the blue-wavelength semiconductor laser light source arrays (1-1) are perpendicular to the axial direction of the laser beam combination lens assembly (2) and arranged on the two sides of the laser beam combination lens assembly (2), and the laser beam combination lens assembly (2) converges parallel incident semiconductor laser light into a smaller light spot on a certain focus.

4. The intelligent automotive headlamp module with combined functions according to claim 1, characterized in that the two-dimensional electric-controlled deflecting reflector unit (3) is controlled by an external electronic signal to rapidly rotate in a reciprocating mode around the rotation axis of the two-dimensional electric-controlled deflecting reflector unit, and in the high-speed reciprocating rotation process, a relative zero state of the rotation axis, namely the angle at an initial position, can be measured at any specific moment and is fed back to an external circuit in real time.

5. The intelligent automotive headlamp module with combined functions according to claim 4, characterized in that a reflector of the two-dimensional electric-controlled deflecting reflector unit (3) is mounted on the rotation axis of the two-dimensional electric-controlled deflecting reflector unit, the reflector comprising reflecting surfaces (A-1, B-1) whose normal lines are perpendicular to the rotation axis, and the reflector can be controlled by the two-dimensional electric-controlled deflecting reflector unit to rotate around the rotation axis;

meanwhile, the normal lines of the reflecting surfaces (A-1, B-1) of the reflector also swing around the axis in a reciprocating mode at a high speed, and thus a reciprocating scanning segment is formed within a rotation angle range defined by the two-dimensional electric-controlled deflecting reflector unit.

6. The intelligent automotive headlamp module with combined functions according to claim 5, characterized in that a first electric-controlled deflecting reflector unit (A) and a second electric-controlled deflecting reflector unit (B) which are spatially perpendicular are mounted on the two-dimensional electric-controlled deflecting reflector unit (3), the first electric-controlled deflecting reflector unit (A) is arranged transversely and used for longitudinal scanning, the second electric-controlled deflecting reflector unit (B) is arranged longitudinally and used for transverse scanning, longitudinal scanning of the first electric-controlled deflecting reflector unit (A) forms a straight line on the second electric-controlled deflecting reflector unit (B), meanwhile, through transverse scanning of the second electric-controlled deflecting reflector unit (B), the laser-converged light spot is made to have the characteristic of progressive scanning in space, and when the first electric-controlled deflecting reflector unit (A) and the second electric-controlled deflecting reflector unit (B), which are spatially perpendicular, swing at a high speed in a reciprocating mode, the converged light spot also moves back and forth for scanning.

7. The intelligent automotive headlamp module with combined functions according to claim 6, characterized in that when a two-dimensional laser scanning device formed by the first electric-controlled deflecting reflector unit (A) and the second electric-controlled deflecting reflector unit (B) rotates in a reciprocating mode at a high speed, the laser light spot also conducts high-speed progressive linear scanning on the transmission-type fluorescent material, and the white light spot formed on the back side of the transmission-type fluorescent material through conversion moves correspondingly; and whereby a visual persistence effect is created which is when is a white rectangular light spot corresponding to the scanning angle is seen with human eyes on a screen a certain distance away from the back side of the transmission-type fluorescent material, and a basic distant light pattern is formed which provides a basic automotive distant light illumination function.

8. The intelligent automotive headlamp module with combined functions according to claim 7, characterized in that a height of the white rectangular light spot, namely a longitudinal scanning range, depends on a deflection angle range of the first electric-controlled deflecting reflector unit (A), and a width of the white rectangular light spot depends on a rotation angle range defined by the second electric-controlled deflecting reflector unit (B).

9. The intelligent automotive headlamp module with combined functions according to claim 7, characterized in that a maximum transverse angle of the white rectangular light spot finally transmitted out through the projection lens assembly (6) is +/−20°, the angle range can be divided by the second electric-controlled deflecting reflector unit (B), and thus a deflection angle of the reflector at a particular moment can be sensed in real-time.

10. The intelligent automotive headlamp module with combined functions according to claim 8, characterized in that a maximum transverse angle of the white rectangular light spot finally transmitted out through the projection lens assembly (6) is +/−20°, the angle range can be divided by the second electric-controlled deflecting reflector unit (B), and thus a deflection angle of the reflector at a particular moment can be sensed in real-time.

11. The intelligent automotive headlamp module with combined functions according to claim 9, characterized in that through the novel intelligent automotive headlamp module, the dark area pixel with the angular resolution of 0.001°*0.001° can be formed in the large white rectangular light spot formed under the visual persistence effect after projection.

12. The intelligent automotive headlamp module with combined functions according to claim 10, characterized in that through the novel intelligent automotive headlamp module, the dark area pixel with the angular resolution of 0.001°*0.001° can be formed in the large white rectangular light spot formed under the visual persistence effect after projection.

13. The intelligent automotive headlamp module with combined functions according to claim 1, characterized in that the first high-reflectivity laser filter and reflection piece (4-1) is arranged in the laser incidence direction of the first projection lens assembly (6-1), blue-wavelength laser light penetrates through the high-reflectivity laser filter and reflection piece (4-1), while infrared-wavelength laser light and green-wavelength laser light are reflected, and thus the blue-wavelength laser light is separated from the infrared-wavelength laser light and the green-wavelength laser light;

the separated infrared-wavelength laser light spreads in the advancing direction of the vehicle after passing through the first high-reflectivity laser filter and enters the projection lens assembly to be projected into an illumination zone in front of a vehicle.

14. The intelligent automotive headlamp module with combined functions according to claim 1, characterized in that the second high-reflectivity laser filter and reflection piece (4-2) is arranged in the laser incidence direction of the second projection lens assembly (6-2), and the green-wavelength laser light penetrates through the high-reflectivity laser filter and reflection piece (4-2) while the infrared-wavelength laser light is highly reflected.

15. The intelligent automotive headlamp module with combined functions according to claim 1, characterized in that the second high-reflectivity laser filter and reflection piece (4-3) is arranged in the laser incidence direction of the third projection lens assembly (6-3), the green-wavelength laser light continues to spread after penetrating through the high-reflectivity laser filter and reflection piece (4-3) till reaching the reflector which can highly reflect the green-wavelength laser light, and then the green-wavelength laser light spreads in the advancing direction of the vehicle to be projected to the illumination zone in front of the vehicle.

16. The intelligent automotive headlamp module with combined functions according to claim 15, characterized in that the high-resolution pixelated green illumination light projected in the illumination zone in front of the vehicle is used for forming a series of special patterns indicating the current vehicle speed, navigation instructions, virtual lane lines and predicted vehicle traveling tracks.

* * * * *